US011925950B2

(12) United States Patent
Drechsel

(10) Patent No.: US 11,925,950 B2
(45) Date of Patent: Mar. 12, 2024

(54) NUTATING LIQUID-EMITTING DEVICE AND COMBINATION THEREOF WITH AN ANTI-NUTATING ADAPTATION KIT

(71) Applicant: Arno Drechsel, Lienz (AT)

(72) Inventor: Arno Drechsel, Lienz (AT)

(73) Assignee: Komet Austria GmbH, Lienz (AT)

( * ) Notice: Subject to any disclaimer, the term of this patent is extended or adjusted under 35 U.S.C. 154(b) by 354 days.

(21) Appl. No.: 17/057,648

(22) PCT Filed: May 30, 2019

(86) PCT No.: PCT/IB2019/054474

§ 371 (c)(1),
(2) Date: Nov. 21, 2020

(87) PCT Pub. No.: WO2019/229688

PCT Pub. Date: Dec. 5, 2019

(65) Prior Publication Data

US 2021/0138492 A1 May 13, 2021

(30) Foreign Application Priority Data

May 30, 2018 (IT) ........................ 102018000005858

(51) Int. Cl.

| | |
|---|---|
| ***B05B 3/00*** | (2006.01) |
| ***B05B 3/04*** | (2006.01) |
| ***B05B 12/36*** | (2018.01) |

(52) U.S. Cl.
CPC ............ *B05B 3/008* (2013.01); *B05B 3/0486* (2013.01); *B05B 12/36* (2018.02)

(58) Field of Classification Search
CPC .................. A01G 25/09; A01G 25/092; B05B 1/262-267; B05B 1/28; B05B 3/008;
(Continued)

(56) References Cited

U.S. PATENT DOCUMENTS

| | | | | |
|---|---|---|---|---|
| 846,491 | A * | 3/1907 | Lutes | B05B 1/267 239/513 |
| 2006/0006254 | A1* | 1/2006 | Meyer | B05B 3/005 239/222.17 |
| 2015/0115066 | A1 | 4/2015 | Drechsel | |

FOREIGN PATENT DOCUMENTS

| | | | |
|---|---|---|---|
| CN | 1735463 | A * | 2/2006 |
| CN | 105537014 | A * | 5/2016 |

(Continued)

*Primary Examiner* — Steven M Cernoch
(74) *Attorney, Agent, or Firm* — Themis Law

(57) ABSTRACT

A liquid-emitting device for gravity-based irrigation systems includes a support structure that defines a first axis and has a nozzle for generating an irrigation jet coaxial with the first axis, a tubular body below the support structure, and a baffle plate facing the nozzle and rotatably mounted in the tubular body to rotate about a second axis. The nozzle is stationary and the second axis is free to rotate about the first axis with a precessional motion. Guides are removably coupled to the tubular body to interact with the baffle plate and prevent the precessional motion while allowing the rotational motion about the second axis. A diverting member may be removably positioned downstream from the nozzle to distribute the liquid over an area of the soil. An arrangement of a nutating liquid-emitting device in combination with an anti-nutating adaptation kit is also disclosed.

10 Claims, 3 Drawing Sheets

(58) Field of Classification Search
CPC ......... B05B 3/18; B05B 3/049; B05B 3/0486; B05B 12/36
USPC ............... 239/726, 222.17, 222.21, 223, 390
See application file for complete search history.

(56) References Cited

FOREIGN PATENT DOCUMENTS

| | | | | |
|---|---|---|---|---|
| CN | 205949096 U | * | 2/2017 |
| EP | 0118630 | | 9/1984 |

* cited by examiner

NUTATING LIQUID-EMITTING DEVICE AND COMBINATION THEREOF WITH AN ANTI-NUTATING ADAPTATION KIT

FIELD OF THE INVENTION

The present invention generally finds application in the field of irrigation systems for agricultural applications, and particularly relates to a liquid-emitting device for irrigation systems.

The invention also relates to an arrangement of a nutating liquid emitting device in combination with an anti-nutating adaptation kit.

BACKGROUND ART

Systems have been long known in the field of irrigation systems which comprise a self-propelled load-bearing truss moving along a portion of soil to be irrigated via one or more motorized wheels.

The structure generally comprises a feeding line for feeding an irrigation liquid, which is connected to a plurality of emitting devices for distributing the liquid over the soil.

In addition, the emitting device typically comprises a support structure with a connector connected to the feeding line having a liquid jet-dispensing nozzle.

The device comprises a baffle plate that faces the nozzle and is adapted to intercept the liquid jet from the feeding line and to act as a diverter to uniformly direct it to a circular area of soil to be irrigated.

The baffle plate is able to normally rotate about a vertical axis under the pressure exerted by the liquid jet.

Nevertheless, in this type of emitting devices the irrigation liquid is distributed over a portion of the soil having a circular plan shape, also proximate to the wheels of the self-propelled truss, whereby the latter will move on a wet soil that creates drag.

Under these conditions, the wheels may form furrows in the soil which will further increase the drag and possibly lead to failure and breaking of the self-propelled truss driving means.

In an attempt to at least partially obviate this drawback, systems have been developed for supporting the emitting devices on the side that faces away from the forward-moving direction of the truss, so that liquid may be distributed downstream from the latter.

Nevertheless, these systems have the drawback of being bulky and increasing equipment installation costs.

A further attempt to obviate the above drawbacks has been the development of emitting devices that could distribute the irrigation liquid over a semicircular area of the soil, opposite to the area with the wheels resting thereupon, to facilitate rolling on dry ground.

EP3248690 discloses a liquid-emitting device for irrigation systems of the above discussed type having a support structure with a baffle plate pivotally coupled thereto, and rotated by the pressure of the irrigation liquid. Thus known device is a nutating device, which means that the plate both rotates on itself and undergoes a precessional motion about an axis inclined to the axis of rotation.

The support structure and the emitter have respective toothed surfaces which are designed to interact to control the rotation of the plate relative to the support, and have respective substantially circular toothless portions to impart a greater rotational speed to the plate and limit the amount of liquid distributed in the corresponding circular area of the soil.

A first drawback of this arrangement is that its construction and assembly are rather complex and it has a relatively high cost.

An additional drawback of this known arrangement is that the presence of toothless surfaces only partially prevents irrigation of the sector area of the soil having the wheels of the self-propelled truss resting thereupon, as the plate continues to rotate over the toothless portion, thereby distributing liquid also outside the area of the soil to be irrigated.

Another drawback of this known arrangement is that the contact surfaces of the various parts of the emitting device are exposed to wear, which leads to the generation of oscillating vibrations of the plate and ultimately to failure of the device, with uneven distribution of the liquid jet over the area of the soil to be irrigated.

Also, a further drawback of this solution is that, due to the wear of these contact surfaces, the emitting member is required to be periodically replaced, which will increase the maintenance costs of the system.

Furthermore, during periodic maintenance of the diffuser device, the operation of the system is stopped, and the soil remains unirrigated for a given time, which will reduce the growth of crops.

In an attempt to at least partially obviate these drawbacks emitting devices have been developed, which comprise an irrigation liquid deflecting element to avoid irrigation of the area of the soil having the wheels of the self-propelled truss resting thereupon.

Nevertheless, this type of baffles cannot be used with existing emitting devices, and requires the use of special irrigation devices, thereby increasing the complexity of the system.

Another drawback of this arrangement is that the baffle causes the irrigation liquid to fall thereunder and create a pool, thereby preventing the uniform irrigation required for crop optimization.

Technical Problem

In view of the prior art, the technical problem addressed by the present invention is to irrigate the soil over an angularly restricted area to reduce drag, wear and vibration on the parts of the device, even with existing devices.

DISCLOSURE OF THE INVENTION

The object of the present invention is to obviate the above drawback, by providing a liquid-emitting device for gravity-based irrigation systems and a removable upgrade kit designed to be fitted to a liquid-emitting device, that are highly efficient and relatively cost-effective.

A particular object of the present invention is to provide a liquid-emitting device as described hereinbefore that can distribute the liquid in a sector portion of the soil.

A further particular object of the present invention is to provide a removable kit to convert an existing liquid-emitting device for distributing irrigation liquid to a circular area into a device for distribution to sectors of the soil.

Another object of the present invention is to provide a liquid-emitting device as described hereinbefore that affords simple and easy installation and maintenance.

Yet another object of the present invention is to provide a liquid-emitting device as described hereinbefore that has a remarkably long life.

These and other objects, as more clearly explained below, are fulfilled by a liquid-emitting device for gravity-based irrigation systems as defined in claim 1, comprising a support structure that defines a first longitudinal axis and has a nozzle for generating an irrigation jet coaxial with the first axis, a substantially tubular body located below the support structure and a substantially circular baffle plate facing the nozzle and rotatably mounted in the tubular body to rotate about a second longitudinal axis.

According to a peculiar aspect of the invention, the first axis and the nozzle are stationary relative to the support structure, the second longitudinal axis is free to rotate about the first axis with a precessional motion, and guide means are designed to be removably coupled to the tubular body to interact with the baffle plate and prevent the precessional motion about the first axis while allowing the rotational motion about the second axis. A diverting member is also adapted to be removably positioned downstream from the nozzle to direct the jet over a sector portion of the baffle plate and distribute the liquid over a sector area of the soil.

With this combination of features the emitting device can distribute liquid over a sector-shaped area of the soil.

Moreover, as the baffle plate is only able to rotate about its own axis of rotation without any precessional motion, the device is less exposed to vibration and hence to wear and is more durable and reliable.

The invention also relates to an arrangement of a nutating liquid emitting device in combination with an anti-nutating adaptation kit, for distributing liquid in a sector area of the soil, as defined in claim 13.

Advantageous embodiments of the invention are obtained in accordance with the dependent claims.

BRIEF DESCRIPTION OF THE DRAWINGS

Further features and advantages of the invention will become more apparent upon reading the following detailed description of a few preferred non-exclusive embodiments of a liquid-emitting device for gravity-based irrigation systems and a removable upgrade kit designed to be fitted to a liquid-emitting device, which is described by way of a non-limiting example with the help of the accompanying drawings in which.

DETAILED DESCRIPTION OF A PREFERRED EXEMPLARY EMBODIMENT

Figure 1:
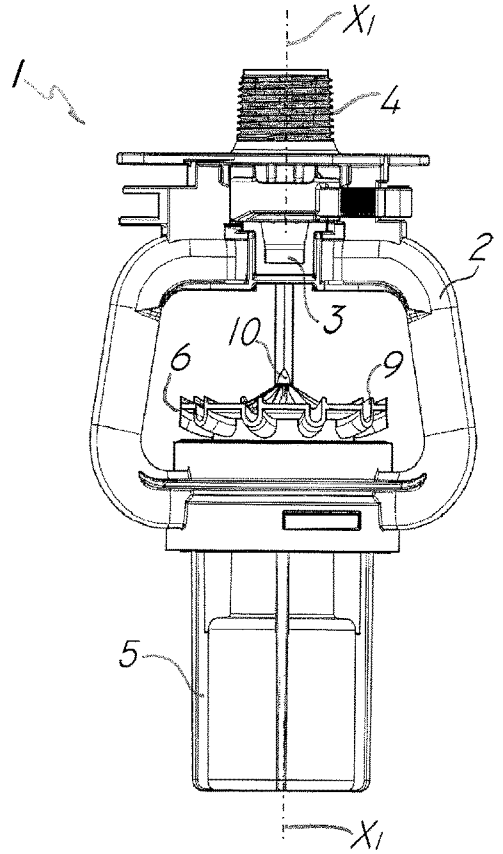
FIGS. 1 and 3 are side views of a liquid emitter of the invention in two different operating positions.

FIG. 1 shows an emitter device for gravity-based irrigation systems according to the invention, generally designated with numeral 1, which is designed for distribution of an irrigation liquid, generally water, over a soil to be irrigated.

In particular, the emitter device 1 may be suspended and connected to an irrigation liquid feeding line via a drop line, not shown, to provide irrigation systems of "center pivot" type or the like, moving by means of one or more motorized wheels.

Figure 2:
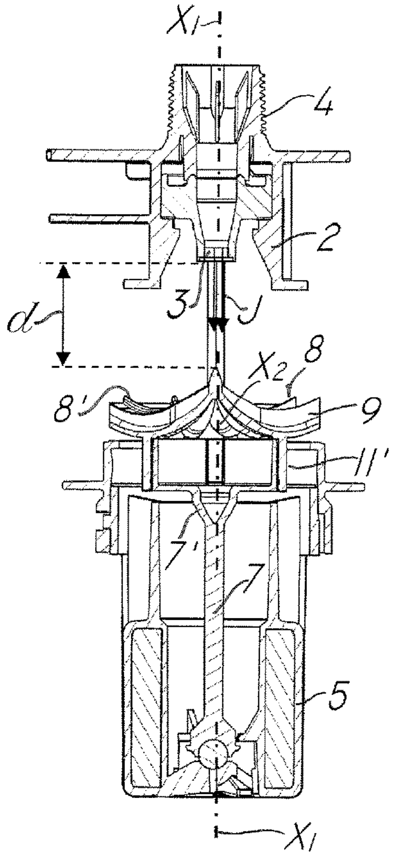
FIGS. 2 and 4 are sectional views of the liquid emitter of FIGS. 1 and 3 respectively.

As best shown in FIGS. 1 and 2, the emitter device 1 comprises a support structure 2 which defines a substantially central first longitudinal axis $X_1$ and has a stationary and removable nozzle 3 for generating a downwardly oriented liquid jet J. Nevertheless, it cannot be excluded that the nozzle 3 may be oriented to direct the jet J upwards.

Conveniently, the support structure 2 may be connected to the irrigation liquid feeding line via a connector 4 to supply the liquid to the nozzle 3.

A substantially tubular body 5 is placed below the support structure 2 and has a substantially circular baffle plate rotatably mounted therein in front of the nozzle 3 to divert and radially distribute the liquid jet J.

The baffle plate 6 can rotate about a second longitudinal axis $X_2$, like in the illustrated configuration, and may comprise a support stem 7 fitting in the tubular body 5, to rotate around said second axis $X_2$.

Alternatively, the plate 6 can rotate about the second axis $X_2$ without the provision of a stem 7, for example using a rotating support according to any one of the schemes known to a skilled person.

Advantageously, the plate 6 may be placed at a predetermined distance d from the nozzle 3 and may comprise a first portion 8 with at least partially radial grooves 9 formed thereon, possibly slightly inclined to a radius of the plate 6, and directed toward the jet J to increase the range of the irrigation liquid jet and improve the liquid distribution uniformity.

In order to direct the liquid toward the jet J, the surface 8' of the first portion 8 of the plate 6 facing the nozzle 3 may have a concave configuration with a central cusp 10 at the inlet area of the liquid accelerated by the nozzle 3.

The rotation of the plate 6 around the second longitudinal axis $X_2$, actually operating as a hydraulic impeller, will be caused, as is known per se, by the flow of liquid delivered from the nozzle 3 and discharged through the grooves 9.

As shown in FIGS. 5A to 5D, the plate 6 may comprise a second portion 11 having a substantially cylindrical and tubular shape and a predetermined outside diameter D1 as well as a substantially tubular outer surface 11', allowing it to be removably fitted to one end 7' of the support stem 7.

According to a peculiar aspect of the invention, the first longitudinal axis $X_1$ and the nozzle 3 are stationary relative to the support structure 2 and the second longitudinal axis $X_2$ is free to rotate about the first axis $X_1$ with a precessional motion, and guide means 12 are designed to be removably coupled to the tubular body 5 to interact with the baffle plate 6 and prevent the precessional motion about the first axis $X_1$ while allowing the rotational motion about the second axis $X_2$.

A diverting member 13 is also adapted to be removably positioned downstream from the nozzle 3 to direct the jet J over a sector portion 14 of the surface 8' of the baffle plate 6 to distribute the liquid over a sector area of the soil.

Figure 3:
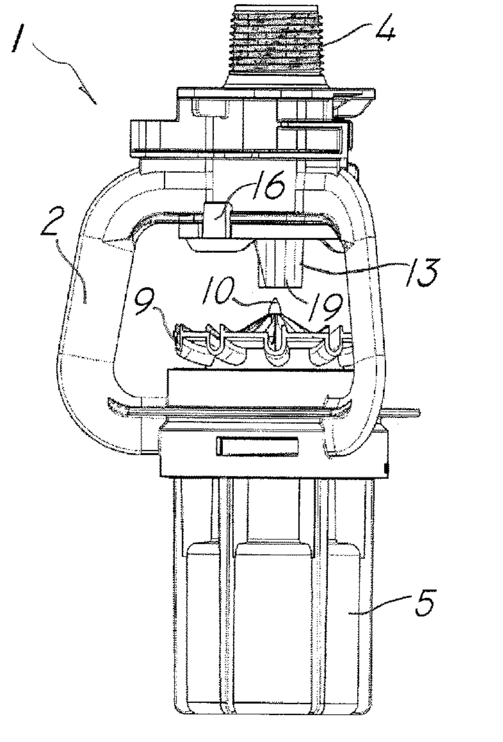
Figure 4:
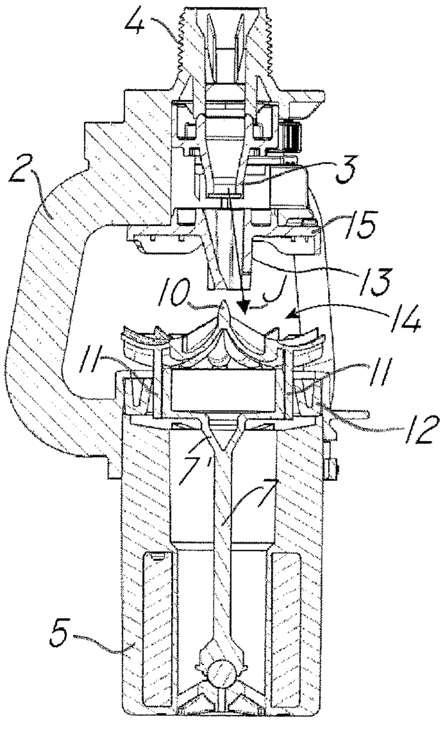
Figure 5A:
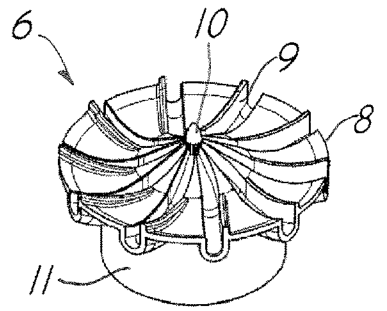
FIGS. 5A to 5D are a perspective view, a side view, a top view and a broken-away side view of a first detail of the liquid emitter of FIG. 3.
Figure 5B:
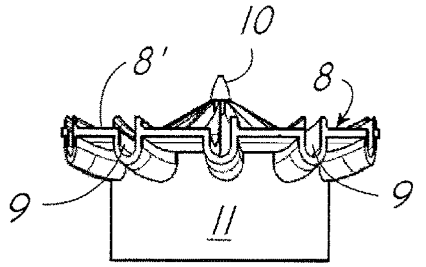
Figure 5C:
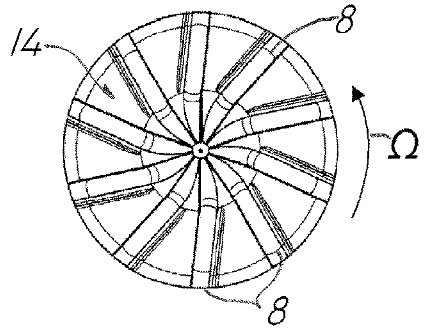
Figure 5D:
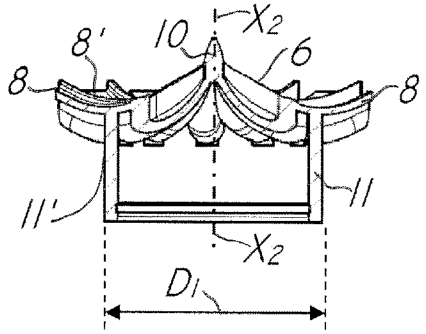

As is clearly shown in FIGS. 3, 4 and in FIGS. 6A to 6D, the diverting member 13 may comprise a substantially plate-like circular connecting portion 15 for connection to the support structure 2 via a plurality of peripheral latching members 16.

Furthermore, the diverting member 13 may comprise a substantially beak-shaped channeling portion 17, with an inlet opening 18 for the irrigation liquid at the connecting portion 15 and a substantially elongate outlet opening 19 that faces the baffle plate 6.

The outlet opening 19 extends substantially in a diametrical direction Y that is radially offset from the first central longitudinal axis $X_1$ of the emitter device 1 to channel the jet J toward the sector portion 14 of the plate 6 and cause the liquid to be distributed over an area of the soil located beyond said diametrical direction Y.

Thus, the liquid from the feeding line of the irrigation system may flow through the connector 4 of the support structure 2, the nozzle 3 and then the channeling portion 17 of the diverting member 13 and our of the outlet opening 19 thereof, thereby generating a jet J directed toward the sector portion 14 of the baffle plate 6.

Conveniently, the outlet opening 19 may have two substantially straight branches 19A, 19B that are slightly inclined toward each other, and one of the two branches 19A may have a greater cross section than the other arm 19B to create a specially shaped jet J.

Thus, the liquid jet J that flows through the outlet opening 19 of the diverting member 13 may have a longer-range portion flowing through the branch with the greater cross section 19A, and may impart a torque in a predetermined direction Ω on the grooves 9 of the first portion 8 of the baffle plate 6. For example, in the illustrated embodiment, namely in FIG. 5C, the baffle plate 6 as seen from the top will be rotated counterclockwise.

The branches 19A, 19B may be inclined toward each other by a predetermined angle β corresponding to the amplitude of the sector portion 14, which may range from 70° to 270°.

In a preferred embodiment of the invention, as shown in the figures, the diverting member 13 is adapted to direct the irrigation liquid jet J to sector portion 14 having an amplitude of about 180° to distribute the liquid over a semicircular area of the soil.

Figure 6A:
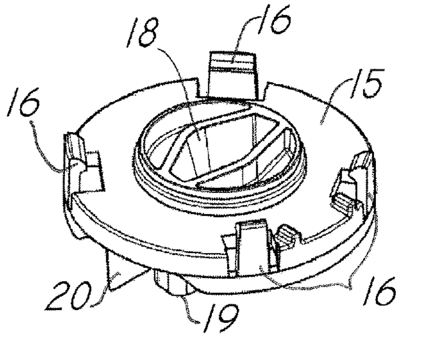
FIGS. 6A to 6D are a perspective view, a side view, a top view and a broken-away side view of a second detail of the liquid emitter of FIG. 3.
Figure 6B:
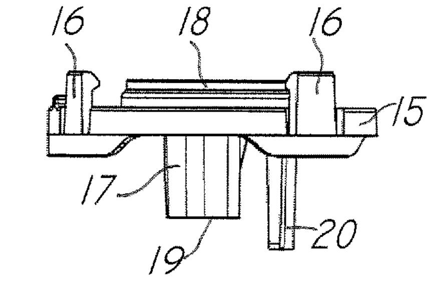
Figure 6C:
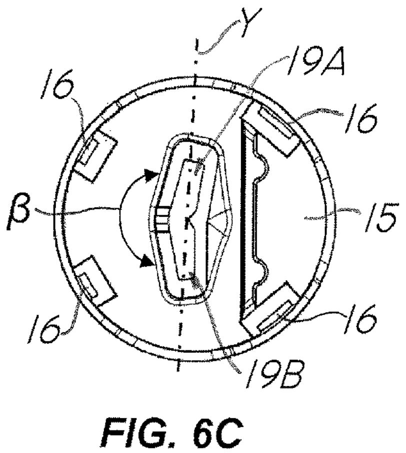
Figure 6D:
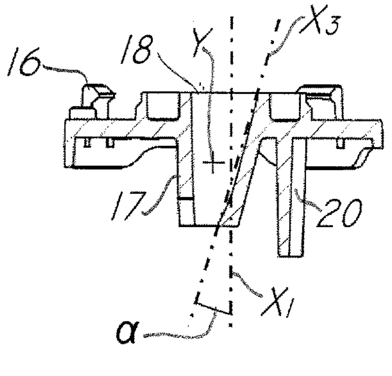
Figure 7A:
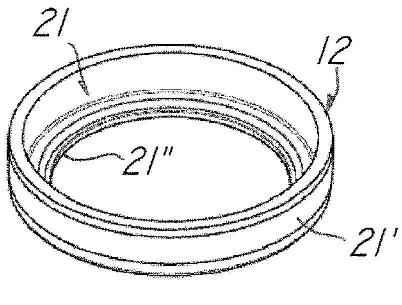
FIGS. 7A to 7C are a perspective view, a broken-away perspective view and a broken-away side view of a third detail of the liquid emitter of FIG. 3.
Figure 7B:
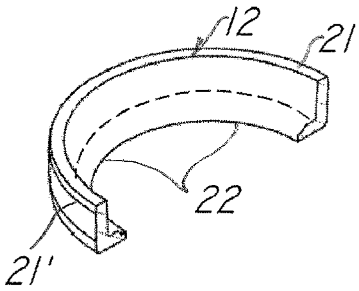
Figure 7C:
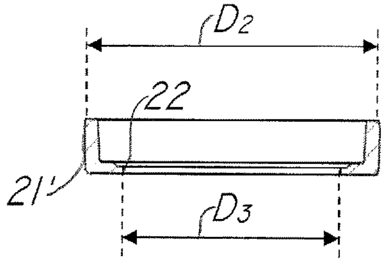
Figure 7D:
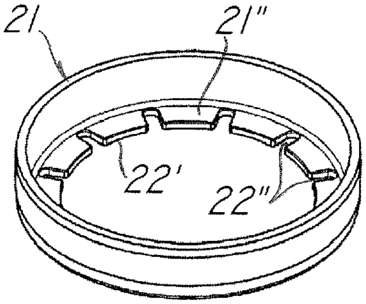
FIGS. 7D to 7E are a perspective view and a top view of a preferred embodiment of the detail as shown in FIGS. 7A to 7C.
Figure 7E:
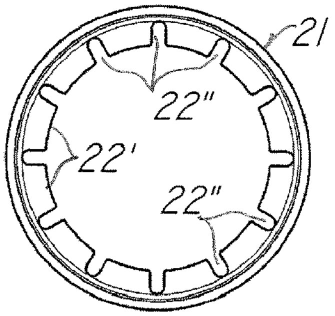

Conveniently, as best shown in FIG. 6D, the channeling portion 17 of the beak-shaped diverting member 13 may have a gradually decreasing cross section, for accelerating the liquid toward the outlet opening 19 and causing the baffle plate 6 to rotate.

Furthermore, the channeling portion 17 of the diverting member 13 is formed with such a shape as to orient the irrigation liquid jet J in an axial direction $X_3$ having a predetermined inclination α to the first longitudinal axis $X_1$ such that the liquid will be directed to the sector portion 14 of the plate 6, as shown in FIGS. 4 and 6D.

Advantageously, the connecting portion 15 of the diverting member 13 may have a shielding extension 20 that faces the baffle plate 6 to divert any liquid splashes from the outlet opening 19 of the channeling portion 17 away from the diametrical direction Y.

With this geometry, all the irrigation liquid that flows out of the outlet opening 19 of the diverting member 13 is oriented toward the sector portion 14 of the baffle plate 6 and is thus distributed to a sector area of the soil.

In a preferred embodiment of the invention, the guide means 12 may comprise an annular element 21 with an outer surface 21' and an inner surface 21" that have a substantially cylindrical shape and are substantially coaxial, having an outside diameter D2 and an inside diameter D3 respectively.

As shown in FIG. 4, the annular element 21 may be placed in the tubular body 5 of the emitting device 1, coaxial with the second cylindrical portion 11 of the plate 6, such that the outer surface 11' of the latter will slidingly contact the inner surface 21" of the annular element 21, to thereby somewhat form a plain bearing, keep the second longitudinal axis $X_2$ coaxial with the first longitudinal axis $X_1$ and prevent any precessional motion.

Figure 8:
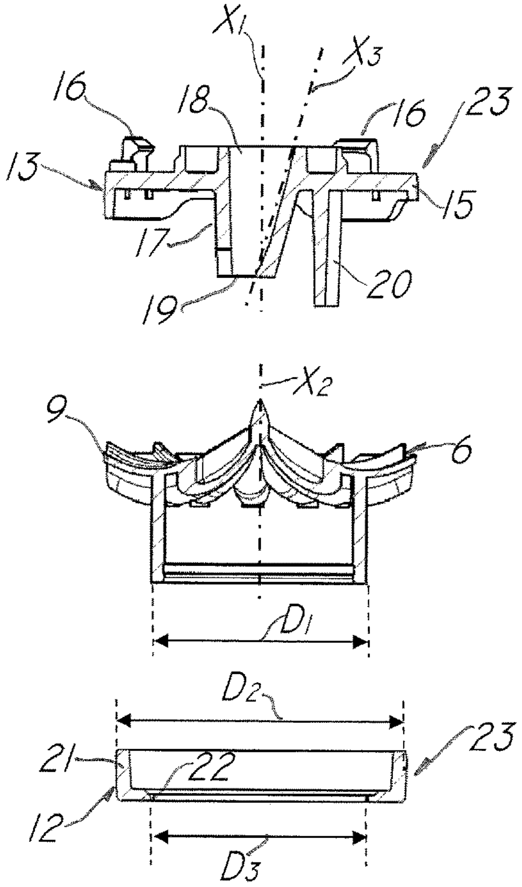
FIG. 8 is a broken-away side view of the detail of FIG. 6 and of the removable upgrade kit of the invention.

Then, the second cylindrical portion 11 of the baffle plate 6 may have an outside diameter D1 that is slightly smaller than the inside diameter D3 of the annular element 21, such that the plate 6 may be centered and its vibration may be reduced as it rotates about its second longitudinal axis X2, as best shown in FIG. 8.

In a second embodiment, as shown in FIG. 4, the annular element 21 will preferably have a substantially frustoconical inner surface 21" with a circular rim 22 intended to slidingly contact the second substantially cylindrical portion 11 of the baffle plate 6, which will reduce the contact area and hence friction between the contact surfaces 11', 21".

In a further embodiment of the invention, as shown in FIGS. 7A to 7E, the annular element 21 may have a substantially L-shaped axial cross section, wherein the outer vertical surface 21' is secured within the tubular body 5 and the inner horizontal annular surface 21" has a circular rim 22 defining the surface in sliding contact with the second cylindrical portion 11 of the baffle plate 6.

In particular, in this additional embodiment, the circular rim 22 may comprise a plurality of projections 22' separated by corresponding channels 22", to prevent accumulation of irrigation liquid on the sliding surface of the annular element 21 and the second cylindrical portion 11 of the baffle plate 6.

Conveniently, the annular element 21 may be formed with a highly wear-resistant base material selected, for example, from the group comprising fiber-reinforced thermoplastic materials, to thereby increase the overall durability of the emitting device 1.

In a further aspect, the invention provides an arrangement of a nutating liquid-emitting device 1 in combination with an anti-nutating adaptation kit, as generally shown in FIG. 8.

The wobble-preventing kit 23 may be removably fitted to an existing liquid-emitting device 1 with a support structure 2 defining a first central longitudinal axis $X_1$ and a nozzle 3 to generate an irrigation jet J along the first axis $X_1$.

Furthermore, the device 1 comprises a substantially tubular body 5 located below the support structure 2 and a substantially circular baffle plate in front of the nozzle 3 and rotatably mounted within the tubular body 5 to rotate about a second longitudinal axis $X_2$.

Therefore, the first axis $X_1$ and the nozzle 3 are stationary relative to the support structure 2 and the device 1 to be upgraded may be of the nutating type, with the second longitudinal axis $X_2$ free to rotate about the first axis $X_1$ with a precessional motion, whereby the plate 6 may precess about the central axis $X_1$.

By this arrangement, the nozzle 3 may be adapted to direct the irrigation liquid proximate to the central area of the plate 6 for the latter to distribute the liquid to a circular area of soil.

Advantageously, the anti-nutating adaptation kit 23 is designed to be removably connected to the emitting device 1 and comprises the guide means 12 designed to be removably mounted within the tubular body 5 to interact with the deflector plate 6 and fix the second longitudinal axis $X_2$ for the latter to coincide with the first longitudinal axis $X_1$ of the support structure 2 and with the axis of the nozzle 3.

Furthermore, the anti-nutating adaptation kit 23 comprises the diverting member 13 adapted to be removably fitted to the support structure 2 downstream from the nozzle 3 to divert the jet J over a sector portion 14 of the baffle plate 6 and distribute the liquid over a sector area of the soil.

In practice, the upgrade kit 23 comprises the annular element 21 and the diverting member 13 as described above, which perform the above discussed functions.

The removable anti-nutating adaptation kit 23 will be able to convert a nutating emitting device 1 distributing liquid over a circular area of the soil to a device having a simply rotating baffle plate 6, to thereby distribute the liquid over a sector area of the soil.

The above disclosure clearly shows that the liquid diffuser device of the invention fulfills the intended objects and particularly meets the requirements of being easy to manufacture, of reducing friction and vibrations on the stem during operation of the system, and of having a longer life as compared with currently available diffuser devices.

The device of the invention is susceptible to a number of changes and variants, within the inventive concept disclosed in the appended claims. All the details thereof may be replaced by other technically equivalent parts, and the materials may vary depending on different needs, without departure from the scope of the invention.

While the device has been described with particular reference to the accompanying figures, the numerals are only used for the sake of a better intelligibility of the invention and shall not be intended to limit the claimed scope in any manner.

INDUSTRIAL APPLICABILITY

The present invention may find application in industry, because it can be produced on an industrial scale in factories for manufacturing liquid-emitting devices for irrigation of predetermined soil surfaces.

The invention claimed is:

1. A liquid-emitting device (1) for gravity-based irrigation systems, comprising:

a support structure (2) that defines a first longitudinal axis (X1) and has a nozzle (3) for generating an irrigation jet (J) coaxial with said first longitudinal axis (X1);

a tubular body (5) located below said support structure (2);

a circular baffle plate (6) facing said nozzle (3) and rotatably mounted in said tubular body (5) to rotate about a second longitudinal axis (X2), wherein said liquid-emitting device (1) is a nutating device in which said circular baffle (6) is rotatable about said second longitudinal axis (X2) and has a precessional motion about said first longitudinal axis (X1), and wherein said first longitudinal axis (X1) and said nozzle (3) are stationary relative to said support structure (2), said second longitudinal axis (X2) being free to rotate about said first longitudinal axis (X1) with said precessional motion;

a guide (12) designed to be removably coupled to said tubular body (5) to interact with said baffle plate (6) and prevent said precessional motion about said first longitudinal axis (X1) while allowing a rotational motion about said second longitudinal axis (X2); and a diverting member (13) removably placed downstream of said nozzle (3) to direct the irrigation jet (J) over a sector portion (14) of said baffle plate (6) and distribute the liquid over a sector area of a soil, wherein said guide (12) comprises an annular element (21) having a predetermined inside diameter (D3), said annular element being configured to be placed in said tubular body (5), said baffle plate (6) having a first portion (8) with radial grooves (9) directed toward the irrigation jet (J) and a second portion (11) having a cylindrical shape with an outside diameter (D1) that is smaller than said inside diameter (D3) of said annular element (21), and wherein said annular element (21) has a cylindrical inner surface (21") that is configured to slidingly contact said second portion (11) of said baffle plate (6) to keep said second longitudinal axis ($X_2$) coaxial with said first longitudinal axis ($X_1$) and prevent said precessional motion.

2. A liquid-emitting device (1) for gravity-based irrigation systems, comprising:

a support structure (2) that defines a first longitudinal axis ($X_1$) and has a nozzle (3) for generating an irrigation jet (J) coaxial with said first longitudinal axis ($X_1$);

a tubular body (5) located below said support structure (2);

a circular baffle plate (6) facing said nozzle (3) and rotatably mounted in said tubular body (5) to rotate about a second longitudinal axis ($X_2$), wherein said liquid-emitting device (1) is a nutating device in which said circular baffle (6) is rotatable about said second longitudinal axis ($X_2$) and has a precessional motion about said first longitudinal axis ($X_1$), and wherein said first longitudinal axis ($X_1$) and said nozzle (3) are stationary relative to said support structure (2), said second longitudinal axis ($X_2$) being free to rotate about said first longitudinal axis ($X_1$) with said precessional motion;

a guide (12) designed to be removably coupled to said tubular body (5) to interact with said baffle plate (6) and prevent said precessional motion about said first longitudinal axis ($X_1$) while allowing a rotational motion about said second longitudinal axis ($X_2$); and a diverting member (13) removably placed downstream of said nozzle (3) to direct the irrigation jet (J) over a sector portion (14) of said baffle plate (6) and distribute the liquid over a sector area of a soil, wherein said guide (12) comprises an annular element (21) having a predetermined inside diameter (D3), said annular element being configured to be placed in said tubular body (5), said baffle plate (6) having a first portion (8) with radial grooves (9) directed toward the irrigation jet (J) and a second portion (11) having a cylindrical shape with an outside diameter (D1) that is smaller than said inside diameter (D3) of said annular element (21), and wherein said annular element (21) has a frustoconical inner surface (21") with a circular rim (22) for slidingly contacting said second cylindrical portion (11) of said baffle plate (6), to reduce friction between contact surfaces.

3. A liquid-emitting device (1) for gravity-based irrigation systems, comprising:

a support structure (2) that defines a first longitudinal axis (X1) and has a nozzle (3) for generating an irrigation jet (J) coaxial with said first longitudinal axis (X1);

a tubular body (5) located below said support structure (2);

a circular baffle plate (6) facing said nozzle (3) and rotatably mounted in said tubular body (5) to rotate about a second longitudinal axis (X2), wherein said liquid-emitting device (1) is a nutating device in which said circular baffle (6) is rotatable about said second longitudinal axis (X2) and has a precessional motion about said first longitudinal axis (X1), and wherein said first longitudinal axis (X1) and said nozzle (3) are stationary relative to said support structure (2), said second longitudinal axis (X2) being free to rotate about said first longitudinal axis (X1) with said precessional motion;

a guide (12) designed to be removably coupled to said tubular body (5) to interact with said baffle plate (6) and prevent said precessional motion about said first longitudinal axis (X1) while allowing a rotational motion about said second longitudinal axis (X2); and a diverting member (13) removably placed downstream of said nozzle (3) to direct the irrigation jet (J) over a sector portion (14) of said baffle plate (6) and distribute the liquid over a sector area of a soil, wherein said diverting member (13) has a plate-shaped connecting portion (15) for connection to said support structure (2) and a beak-shaped channeling portion (17) with an elongate outlet opening (19), and wherein said outlet opening (19) has two straight branches (19A, 19B) that are inclined toward each other, one of said two straight branches (19A) having a greater cross section than a second one of said two straight branches (19B) to create a shaped jet (J).

4. The liquid-emitting device as claimed in claim 3, wherein said baffle plate (6) is designed to rotate about said second longitudinal axis ($X_2$) via a stem (7) engaged in said tubular body (5) or via a rotating support.

5. The liquid-emitting device as claimed in claim 3, wherein said elongate outlet opening (19) extends in a diametrical direction (Y), radially offset from said first longitudinal axis ($X_1$) to direct the irrigation jet (J) toward said sector portion (14) of said baffle plate (6) and cause the liquid to be distributed over an area of the soil situated beyond the diametrical direction (Y).

6. The liquid-emitting device as claimed in claim 5, wherein said connecting portion (15) of said diverting member (13) has a shielding extension (20) to divert any liquid splashes away from said diametrical direction (Y).

7. The liquid-emitting device as claimed in claim 3, wherein said two straight branches (19A, 19B) are inclined toward each other by a predetermined angle (β) corresponding to an amplitude of said sector portion (14), the amplitude of said sector portion (14) ranging from 70° to 270°.

8. A liquid-emitting device (1) for gravity-based irrigation systems, comprising:

a support structure (2) that defines a first longitudinal axis (X1) and has a nozzle (3) for generating an irrigation jet (J) coaxial with said first longitudinal axis (X1);

a tubular body (5) located below said support structure (2);

a circular baffle plate (6) facing said nozzle (3) and rotatably mounted in said tubular body (5) to rotate about a second longitudinal axis (X2), wherein said liquid-emitting device (1) is a nutating device in which said circular baffle (6) is rotatable about said second longitudinal axis (X2) and has a precessional motion about said first longitudinal axis (X1), and wherein said first longitudinal axis (X1) and said nozzle (3) are stationary relative to said support structure (2), said second longitudinal axis (X2) being free to rotate about said first longitudinal axis (X1) with said precessional motion;

a guide (12) designed to be removably coupled to said tubular body (5) to interact with said baffle plate (6) and prevent said precessional motion about said first longitudinal axis (X1) while allowing a rotational motion about said second longitudinal axis (X2); and a diverting member (13) removably placed downstream of said nozzle (3) to direct the irrigation jet (J) over a sector portion (14) of said baffle plate (6) and distribute the liquid over a sector area of a soil, wherein said diverting member (13) has a plate-shaped connecting portion (15) for connection to said support structure (2) and a beak-shaped channeling portion (17) with an elongate outlet opening (19), and wherein said beak-shaped channeling portion (17) has a gradually decreasing cross section, for accelerating the liquid toward said outlet opening (19), and is formed with such a shape as to orient the irrigation jet (J) in an axial direction ($X_3$) having a predetermined inclination (α) to said first longitudinal axis ($X_1$).

9. The liquid-emitting device as claimed in claim 8, wherein said support structure (2) has a connector (4) for connection to an irrigation liquid feeding line and for supplying the liquid to said nozzle (3).

10. An arrangement of a nutating liquid-emitting device (1) in combination with an anti-nutating adaptation kit (23), wherein said nutating liquid-emitting device (1) comprises, a support structure (2) that defines a first longitudinal axis ($X_1$), a nozzle (3) for generating an irrigation jet (J) along said first longitudinal axis ($X_1$), a tubular body (5) located below said support structure (2), and a circular baffle plate (6) facing said nozzle (3) and rotatably mounted in said tubular body (5) to rotate about a second longitudinal axis ($X_2$), wherein said first longitudinal axis ($X_1$) and said nozzle (3) are stationary relative to said support structure (2), wherein said second longitudinal axis ($X_2$) is free to rotate about said first longitudinal axis ($X_1$) with a precessional motion, and wherein said circular baffle (6) has a precessional motion about said first longitudinal axis ($X_1$), and wherein said anti-nutating adaptation kit (23) is adapted to be removably connected to said nutating liquid-emitting device (1) and includes a guide (12) designed to be removably mounted in said tubular body (5) to interact with said circular baffle plate (6) and fix said second longitudinal axis ($X_2$) for the circular baffle plate to coincide with said first longitudinal axis ($X_1$) of said support structure (2) and with an axis of said nozzle (3), further comprising a diverting member (13) which is configured be removably coupled to said support structure (2) downstream of said nozzle (3) to divert the irrigation jet (J) over a sector portion (14) of the baffle plate (6) and distribute the liquid over a sector area of a soil.

* * * * *